(12) United States Patent
Lai (10) Patent No.: US 10,705,265 B2
(45) Date of Patent: Jul. 7, 2020

(54) IMAGE SENSING DEVICE AND OPTICAL FILM THEREOF

(71) Applicant: AU Optronics Corporation, Hsin-Chu (TW)

(72) Inventor: Jui-Lin Lai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 594 days.

(21) Appl. No.: 15/659,004

(22) Filed: Jul. 25, 2017

(65) Prior Publication Data

US 2018/0031742 A1 Feb. 1, 2018

(30) Foreign Application Priority Data

Jul. 26, 2016 (TW) .............................. 105123630 A (51) Int. Cl.
*G06K 9/46* (2006.01)
*G02B 5/00* (2006.01)
(Continued)

(52) U.S. Cl.
CPC .............. *G02B 5/003* (2013.01); *G02B 5/201* (2013.01); *G02B 5/208* (2013.01); *G02B 6/005* (2013.01); *G06F 3/0421* (2013.01); *G06K 9/0004* (2013.01)

(58) Field of Classification Search
CPC ...... G06F 3/0412; G06F 3/044; G06F 3/0416; G06F 2203/04106; G06F 3/041; G06F 3/0418; G06F 3/0481; G06F 3/14; G06F 3/147; G06F 2203/04103; G06F 2203/04108; G06F 3/0414; G06F 3/04166;
(Continued)

(56) References Cited

U.S. PATENT DOCUMENTS 6,417,321 B1 7/2002 Minami et al.
2004/0252867 A1* 12/2004 Lan ...................... G06K 9/0004
382/124
(Continued)

FOREIGN PATENT DOCUMENTS

CN 1607435 A 4/2005
CN 102081483 A 6/2011
(Continued)

OTHER PUBLICATIONS

State Intellectual Property Office of the People's Republic of China, "Office Action", dated Jan. 26, 2018.

*Primary Examiner* — Michael P Stafira
(74) *Attorney, Agent, or Firm* — WPAT, PC (57) ABSTRACT

An image sensing device includes a substrate, a light sensing circuit disposed on the substrate, an optical film. The optical film includes a transparent film having a first light transmittance value wherein the first light transmittance value includes a red light transmittance value and a blue light transmittance value, and the red light transmittance value is greater than the blue light transmittance value; and a grating structure having a second light transmittance value, wherein the first light transmittance value is greater than the second light transmittance value. The substrate is sandwiched between the light sensing circuit and the optional film, and a light source disposed on the optical film, wherein the optical film is sandwiched between the substrate and the light source.

15 Claims, 6 Drawing Sheets

(51) Int. Cl.
*G02B 5/20* (2006.01)
*F21V 8/00* (2006.01)
*G06F 3/042* (2006.01)
*G06K 9/00* (2006.01)

(58) Field of Classification Search
CPC .... G06F 3/04847; G06F 1/163; G06F 1/1684; G06F 2203/04102; G06F 2203/04107; G06F 3/017; G06F 3/04164; G06F 3/042; G06F 3/0421; G06F 3/0446; G06F 3/04883; G06F 19/326; G06F 19/3418; G06F 19/3456; G06F 19/3468; G06F 1/022; G06F 1/16; G06F 1/1601; G06F 1/1637; G06F 1/1643; G06F 1/1647; G06F 1/1656; G06F 1/1673; G06F 1/1688; G06F 1/203; G06F 21/32; G06F 2200/201; G06F 2203/04104; G06F 2003/04105; G06F 2203/04111; G06F 2003/04112; G06F 2203/04806; G06F 3/011; G06F 3/012; G06F 3/013; G06F 3/014; G06F 3/0346; G06F 3/04142; G06F 3/04182; G06F 3/04184; G06F 3/0443; G06F 3/0448; G06F 3/0484; G06F 3/0485; G06F 3/0486; G06F 3/0488; G06F 3/04886; G06K 9/004; G06K 19/07749; G06K 7/10316; G06K 9/0002; G06K 9/22; G06K 9/00033; G06K 9/00046; G06K 9/00053; G06K 9/00114; G06K 9/00604; G06K 9/00617; G06K 9/00906; G06K 9/2027; G06K 9/2036; G06K 9/209; G02B 2027/1038; G02B 2027/0025; G02B 6/0051; G02B 6/0055; G02B 6/0073; G02B 6/0083; G02B 2027/0178; G02B 26/04; G02B 27/107; G02B 27/0172; G02B 6/0025

See application file for complete search history.

(56) References Cited

U.S. PATENT DOCUMENTS

| 2011/0157097 | A1* | 6/2011 | Hamada | G02F 1/13338 345/175 |
|---|---|---|---|---|
| 2013/0181896 | A1* | 7/2013 | Gruhlke | G06F 3/0428 345/156 |
| 2015/0301402 | A1 | 10/2015 | Kimura et al. | |
| 2015/0338672 | A1 | 11/2015 | Fang et al. | |
| 2016/0109998 | A1* | 4/2016 | Watanabe | G06F 3/044 349/12 |
| 2019/0243511 | A1* | 8/2019 | Gilton | G06F 3/0421 |

FOREIGN PATENT DOCUMENTS

| CN | 104933421 A | 9/2015 |
|---|---|---|
| CN | 105093542 A | 11/2015 |
| TW | 201440599 A | 10/2014 |

* cited by examiner

IMAGE SENSING DEVICE AND OPTICAL FILM THEREOF

BACKGROUND

Technical Field

The present invention relates to an image sensing device and an optical film thereof. Specifically, the present invention relates to an image sensing device applied to fingerprint recognition and an optical film thereof.

Related Art

With the rapid development and application of information technologies, wireless mobile communication, and information appliances, to further humanize operations, many information products, such as smart phones and notebook computers, are mostly equipped with an image sensing device for fingerprint recognition. In a conventional image sensing device, light rays emitted by a light source are projected by a substrate to a finger of a user, and a finger image is obtained by using a circuit on the substrate, to determine a finger movement direction and distance or recognize lines of the finger.

However, in the conventional image sensing device, multiple optical films are usually disposed, to optimize the obtained finger image. In addition, an anti-scattering film is generally disposed on a back side of the substrate, to provide protection of the substrate and usage safety. As the multiple optical films and the anti-scattering film are disposed, the conventional image sensing device has a certain thickness, and thinning is not easy. In addition, in the conventional image sensing device, mostly a special light emitting diode, for example, a red light emitting diode, is used as a light source. Usage of the special light emitting diode causes problems of low light emitting efficiency and high costs. Therefore, the structure of the existing image sensing device needs to be improved.

SUMMARY

One objective of the present invention is to provide an image sensing device, which has a design that an entire thickness is reduced.

Another objective of the present invention is to provide an optical film, which has an effect of improving an image quality.

The image sensing device includes a substrate, a light sensing circuit disposed on the substrate, an optical film. The optical film includes a transparent film having a first light transmittance value wherein the first light transmittance value includes a red light transmittance value and a blue light transmittance value, and the red light transmittance value is greater than the blue light transmittance value; and a grating structure having a second light transmittance value, wherein the first light transmittance value is greater than the second light transmittance value. The substrate is sandwiched between the light sensing circuit and the optional film, and a light source disposed on the optical film, wherein the optical film is sandwiched between the substrate and the light source. A transmittance of a long-wavelength visible light wave band is improved by using the optical film, which can improve an image quality.

DETAILED DESCRIPTION

The present invention provides an image sensing device, which has a design that an entire thickness is reduced. Scattering light produced after a backlight module inputs light rays to a substrate is reduced by using a grating structure in an optical film, to improve optical performance of the image sensing device. The image sensing device of the present invention may be preferably applied to a liquid crystal display having a touch function, or may be applied to a fingerprint recognition device.

Figure 1:
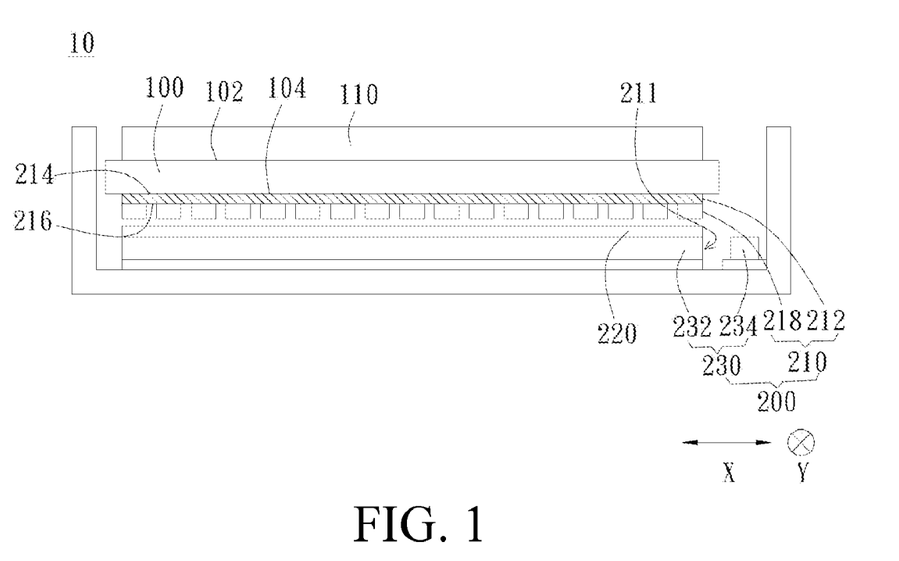
FIG. 1 is a cross-sectional view of an embodiment of an image sensing device of the present invention.

FIG. 1 is a cross-sectional view of an embodiment of an image sensing device 10 of the present invention. As shown in FIG. 1, the image sensing device 10 includes a substrate 100, a light sensing circuit 110, and a backlight module 200. The substrate 100 has a first surface 102 and a second surface 104 opposite to the first surface 102. A light sensing circuit 110 is disposed on the first surface 102 (referring to FIG. 3). The backlight module 200 is disposed adjacent to the second surface 104, and the backlight module 200 includes an optical film 210, an optical film module 220, and a light source 230. The optical film 210 is disposed adjacent to the second surface 104. The optical film module 220 and the light source 230 are disposed on a side of the optical film 210 far away from the substrate 100. In other word, the substrate 100 is sandwiched between the light sensing circuit 110 and the optional film 210. The light source 230 disposed on the optical film 210 wherein the optical film 210 is sandwiched between the substrate 100 and the light source 230.

As shown in FIG. 1, the light source 230 includes a light guide plate 232 and a light emitting module 234, to form a backlight structure in which light enters laterally. The light guide plate 232 is disposed on the side of the optical film 210 far away from the substrate 100. The optical film module 220 is disposed between the light guide plate 232 and the optical film 210. The optical film module 220 may be formed by multiple different optical sheets, for example, a brightness enhancement film and a diffusion film, to guide light rays emitted by the light emitting module 234 and evenly distribute the light rays. The light emitting module 234 is disposed on one end of the light guide plate 232 and is distributed along a lateral edge 211 of the light guide plate 232. The light emitting module 234 produces light rays, and the light rays enter the light guide plate 232 and reach the optical film 210 with the guide of the light guide plate 232. The embodiment of FIG. 1 shows that the light emitting module 234 is distributed along one side of the light guide plate 232, but the present invention is not limited thereto. The light emitting module 234 may be disposed along different sides of the light guide plate 232 according to a requirement, to form an image sensing device having light emitting modules disposed on multiple sides. In a variant of this embodiment, the light source 230 may have a direct-type backlight structure, that is, the light source 230 includes only the light emitting module 234, the light guide plate does not need to be disposed, and the light emitting module 234 is directly disposed evenly below the optical film module 220, to provide uniform light rays.

As shown in FIG. 1, the optical film 210 has a transparent film 212 and a grating structure 218. The transparent film 212 has a first surface 214 and a second surface 216 opposite to the first surface 214. In the embodiment shown in FIG. 1, the grating structure 218 is disposed on the second surface 216 (a surface facing the light source), and includes a plurality of first grid lines and a plurality of second grid lines and is respectively arranged along a first direction X (for example, a horizontal direction) and a second direction Y (for example, a direction perpendicular to a paper surface). The first direction X and the second direction Y both extend in parallel to the first surface 214 and intersect with each other. As shown in FIG. 1, in this embodiment, the first surface 214 of the transparent film 212 is not provided with any other micro structure and is tightly attached to the second surface 104 of the substrate 100, to enhance the structure strength of the substrate 100. However, in a different embodiment, the grating structure 218 may be disposed on the first surface 214.

Figure 2:
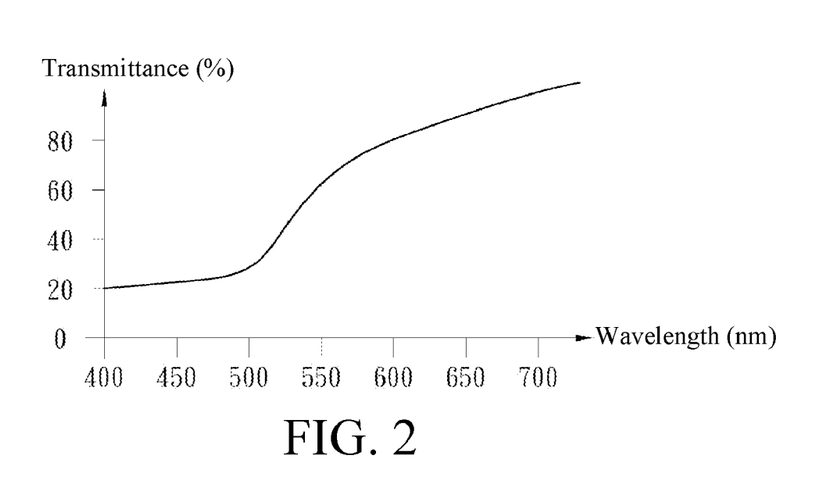
FIG. 2 is a schematic diagram of a transmittance of a transparent film in a visible light wave band.

The optical film preferably utilizes a transparent film whose light transmittance in a red light wave band is greater than a light transmittance in a blue light wave band. In other word, the transparent film having a first light transmittance value wherein the first light transmittance value comprises a red light transmittance value and a blue light transmittance value, and the red light transmittance value is greater than the blue light transmittance value. As shown in a schematic diagram of a transmittance in FIG. 2, the optical film has a higher transmittance in a region whose wavelength is greater than 600 nm than a region whose wavelength is less than 450 nm. For example, a transparent film made of polyimide (PI) has a good transmittance in a long-wavelength wave band. Because a long-wavelength wave band in visible light has a good effect of recognizing a wave crest and trough of fingerprint lines, by means of this design, in visible light rays emitted by the light source, a transmittance in a long-wavelength wave band can be greater than a transmittance in a short-wavelength wave band, to improve an image quality. In another embodiment, a transparent material whose transmittance in a region whose wavelength is greater than 600 nm is greater than 60% and whose transmittance in a region whose wavelength is less than 450 nm is less than 40% may be preferably used as the transparent film. In addition, an optical film having a good transmittance in a long-wavelength wave band may be provided with a white light emitting diode, which can avoid a light emitting efficiency problem caused by usage of a special light emitting diode, and can reduce usage costs of the light source.

Compared with the transparent film, the grating structure has a light transmittance less than a light transmittance of the transparent film. In other word, the grating structure having a second light transmittance value, wherein the first light transmittance value is greater than the second light transmittance value. For example, the grating structure is made of a metal material (for example, copper). In another embodiment, the grating structure may be made of an insulating light shielding material (for example, ink). In the grating structure made of an insulating light shielding material, a light absorbing manner is used, so that some light rays (light rays whose directions deflect) are absorbed, and some light rays pass through the grating structure and keep collimated. In the grating structure made of metal or another highly reflective material, light rays whose directions deflect are reflected, so that light rays can keep collimated after repeated reflection and are output, which can further improve overall brightness as compared with the light absorbing manner. By means of the design of the grating structure, light rays can keep collimated after passing through the grating structure, and scattering light rays are reduced.

Figure 3:
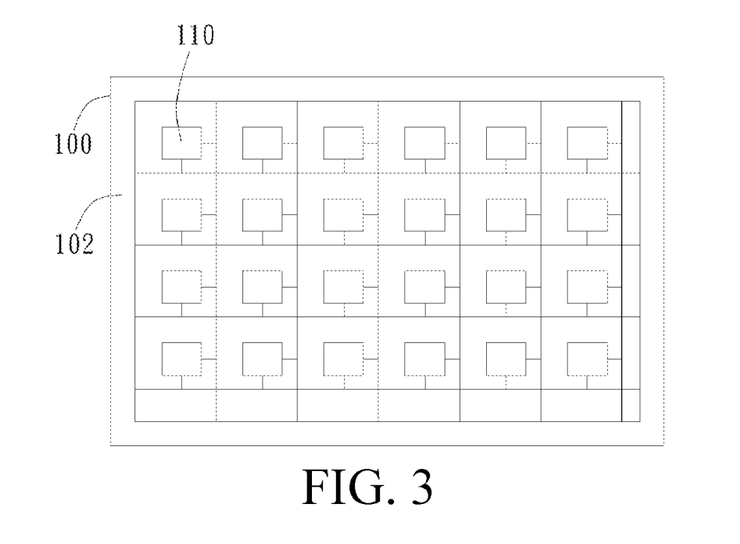
FIG. 3 is a top view of an embodiment of a substrate.

FIG. 3 is a top view of an embodiment of the substrate 100. As shown in FIG. 3, the light sensing circuit 110 is disposed on the first surface 102 of the substrate 100. For example, the light sensing circuit 110 is an optical image sensing circuit. The light sensing circuit 110 includes a thin-film transistor, a light sensor, and the like. When a finger touches the substrate 100, light rays reflected from a touch position are received by the light sensing circuit 110 for position determining and fingerprint recognition.

Figure 4:
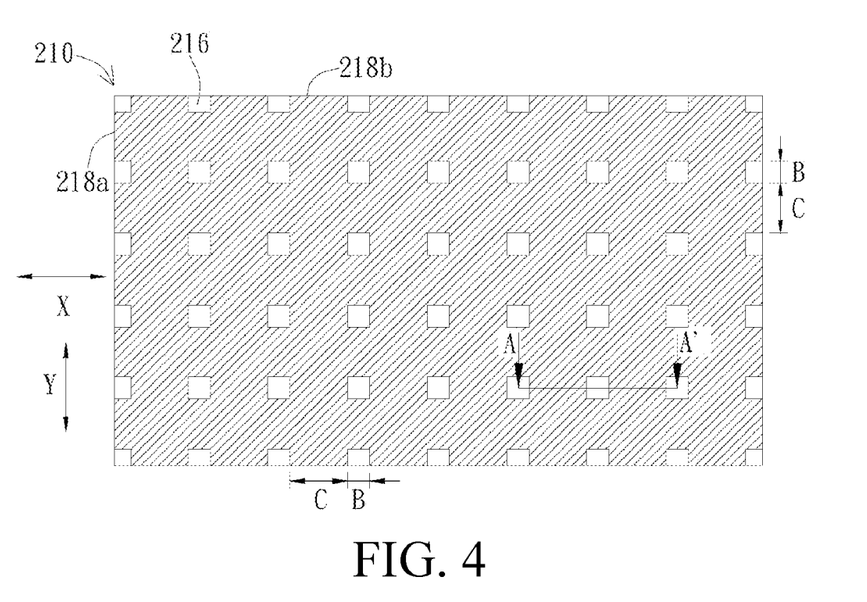
FIG. 4 is a top view of a grating structure from a second surface.

FIG. 4 is a top view of the grating structure 218 from the second surface 216. As shown in FIG. 4, the grating structure 218 forms a grid. The grid is formed by a plurality of first grid lines 218a and a plurality of second grid lines 218b through intersection. The first grid lines 218a are arranged along the first direction X. As shown in FIG. 4, the plurality of first grid lines 218a is parallel to each other and is arranged at intervals. Similarly, the second grid lines 218b are arranged along the second direction Y, and the plurality of second grid lines 218b is parallel to each other and is arranged at intervals.

As described above, after light rays pass through the grating structure 218, the light rays can keep collimated. Specifically, a ratio of a spacing B between two adjacent first grid lines 218a to a width C of the first grid lines 218a preferably ranges from 1:1 to 1:5 (that is, B:C=1:1 to 1:5). In a preferred embodiment, the width C of the first grid lines 218a is increased and the spacing B between adjacent first grid lines 218a is reduced, which can reduce deflected light rays passing through the grating structure, and provide a good light ray collimation effect. The spacing B between two adjacent first grid lines 218a preferably ranges from 10 μm to 50 μm. Similarly, a ratio of a spacing B between two adjacent second grid lines 218b to a width C of the second grid lines 218b preferably ranges from 1:1 to 1:5, and the spacing B between two adjacent second grid lines 218b preferably ranges from 10 μm to 50 μm. In this way, light rays can keep collimated after passing through the grid-shaped grating structure 218. In addition, with the optical film 210 of the present invention, some optical films of an optical film module 220 in a conventional image sensing device can be saved or omitted, to reduce the overall thickness. It should be supplemented that, the grid may be made of a metal material or an insulating light shielding material, their effects in affecting light rays have been described above, and details are not described herein again.

Figure 5:
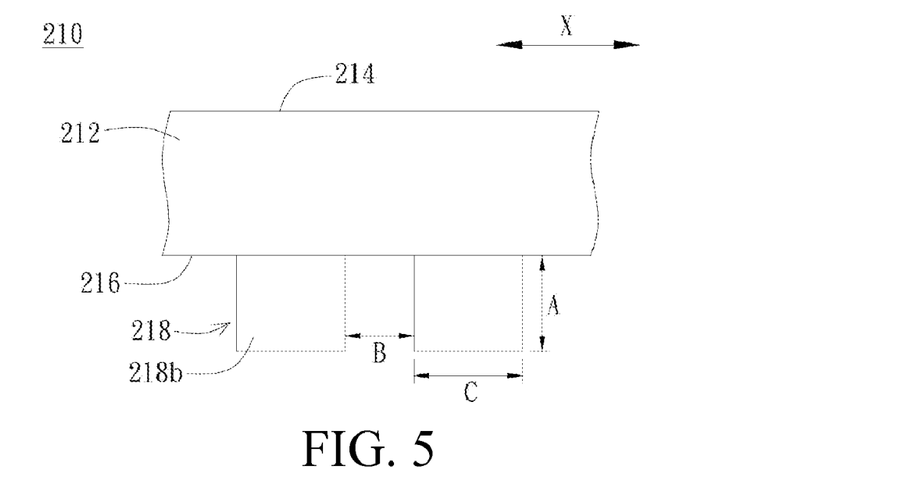
FIG. 5 is an enlarged cross-sectional view of an optical film and a grating structure.

In terms of a height of the grating structure 218, a light ray collimation effect can also be provided. FIG. 5 is an enlarged cross-sectional view of the optical film 210. As shown in FIG. 5, a cross-section of the grating structure 218 in the first direction X (for example, along a sectioning position AA' in FIG. 4) has a plurality of protruded second grid lines 218b arranged at intervals, and a spacing B exists between two adjacent second grid lines 218b. As described above, the ratio of the spacing B to the width C of the second grid lines 218b preferably ranges from 1:1 to 1:5. In terms of the spacing B and a height A of the second grid lines 218b, a ratio of the spacing B to the height A of the second grid lines 218b preferably ranges from 1:2 to 1:10 (that is, B:A=1:2 to 1:10). In other words, the ratio of the spacing B between two adjacent second grid lines 218b to the height A of the second grid lines 218b ranges from 1:2 to 1:10. In this way, light rays can keep collimated after passing through the grid-shaped grating structure.

It should be noted that, the grid shape is not limited to a quadrate shown in FIG. 4. The grid shape may be changed according to a requirement. In other words, the shape of intersections of grid lines in different directions may be changed. For example, according to a manner of manufacturing the grating structure, the grid shape is adjusted to a round hole or a hexagon.

Figure 6:
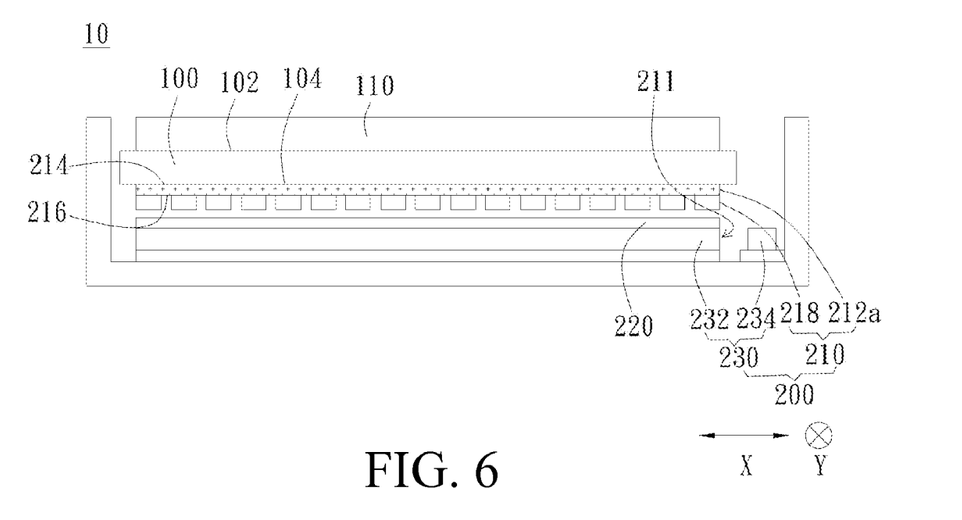
FIG. 6 is a cross-sectional view of another embodiment of the image sensing device of the present invention.

FIG. 6 is a cross-sectional view of another embodiment of the image sensing device 10 of the present invention. In the embodiment shown in FIG. 6, the optical film 210 of the image sensing device 10 uses a dyed transparent film 212a. For example, the transparent film is made of polyimide (PI), and the PI is further dyed. Dye may be yellow or red. In this way, light rays in a long-wavelength wave band can pass, and light rays in a short-wavelength wave band can be filtered out, to improve a transmittance of the light rays in the long-wavelength wave band. In another embodiment, the transparent film 212a may be dyed by using polyethylene terephthalate (PET).

Figure 7:
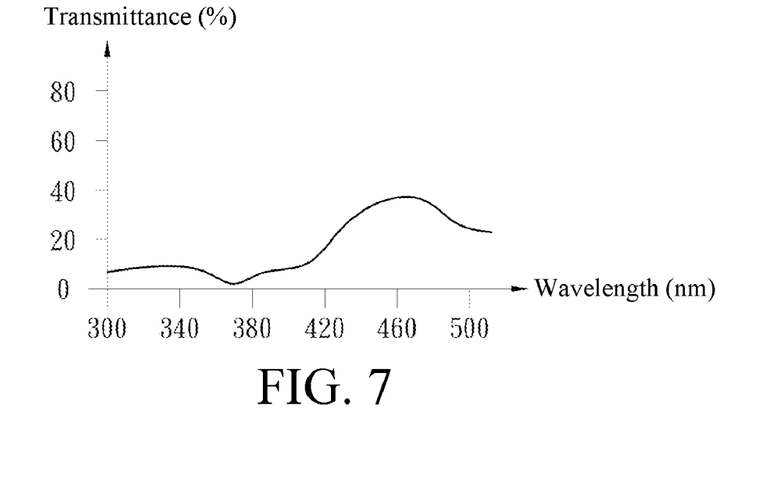
FIG. 7 is a schematic diagram of transmittances of a transparent film in a blue light wave band and an ultraviolet light wave band.

It should be supplemented that, if deterioration impact that may be caused by an ultraviolet light wave band to the optical film 210 and the optical film module 220, a transparent film 212 whose light transmittance in the blue light wave band is greater than a light transmittance in the ultraviolet light wave band is preferably used. As shown in a schematic diagram of a transmittance in FIG. 7, the optical film has a higher transmittance in a region whose wavelength is about 450 nm than a region whose wavelength is less than 400 nm. For example, the transparent film 212 is made of PI, which has a characteristic of low ultraviolet light transmittance, so that impact from ultraviolet light to the optical film and the optical film module can be reduced, and a life time can be improved. In another embodiment, an ultraviolet ray absorption film may be added on the optical film 210, to reduce the impact from ultraviolet light to the optical film 210 and the optical film module 220. In other word, the first light transmittance value further comprises an ultraviolet light transmittance value, and the blue light transmittance value is greater than the ultraviolet light transmittance value.

Figure 8:
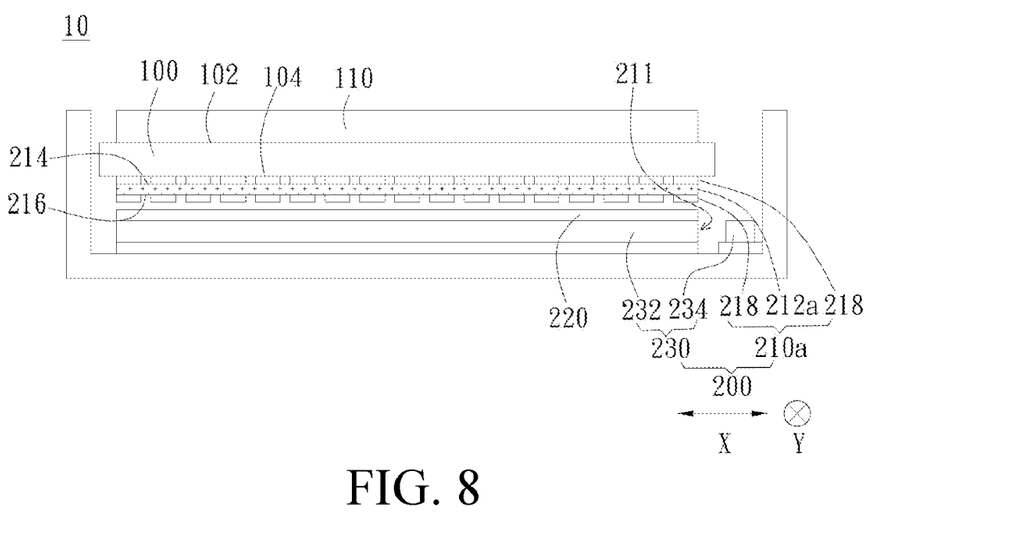
FIG. 8 is a cross-sectional view of an embodiment in which a grating structure is disposed on a first surface and a second surface.

FIG. 8 is a cross-sectional view of an embodiment in which the grating structure 218 is disposed on the first surface 214 and the second surface 216. Different from the embodiment described above, the optical film 210a has two layers of grating structures 218. As shown in FIG. 8, the grid-shaped grating structures 218 are respectively distributed on the first surface 214 and the second surface 216. In addition, projection ranges on the transparent film 212a, of the grid distributed on the first surface 214 and the grid distributed on the second surface 216 are substantially aligned. In other words, the position of the grating structure 218 on the first surface 214 corresponds to and overlaps with the position of the grating structure 218 on the second surface 216. When the grating structure 218 on the first surface 214 is viewed squarely, the grating structure 218 on the other surface is totally blocked. In other word, the grating structure comprises a first grating structure and a second grating structure; and the transparent film is sandwiched between the first grating structure and the second grating structure, and the first grating structure and the second grating structure are symmetrical.

Compared with the grid-shaped grating structure formed on one surface, the two-layer grid-shaped grating structures used in FIG. 8 can reduce a time of waiting for accumulation of a height of the grating structure (save about a half time) during manufacture, to improve production efficiency. Moreover, because a height of the grating structure on one surface can be reduced, manufacturing difficulties can be reduced, and a yield can be improved. In addition, the optical film uses a grating structure made of a metal material, which can enhance rigidness of the substrate, to achieve effects of enhancing strength of the overall structure and improving usage safety.

Figure 9:
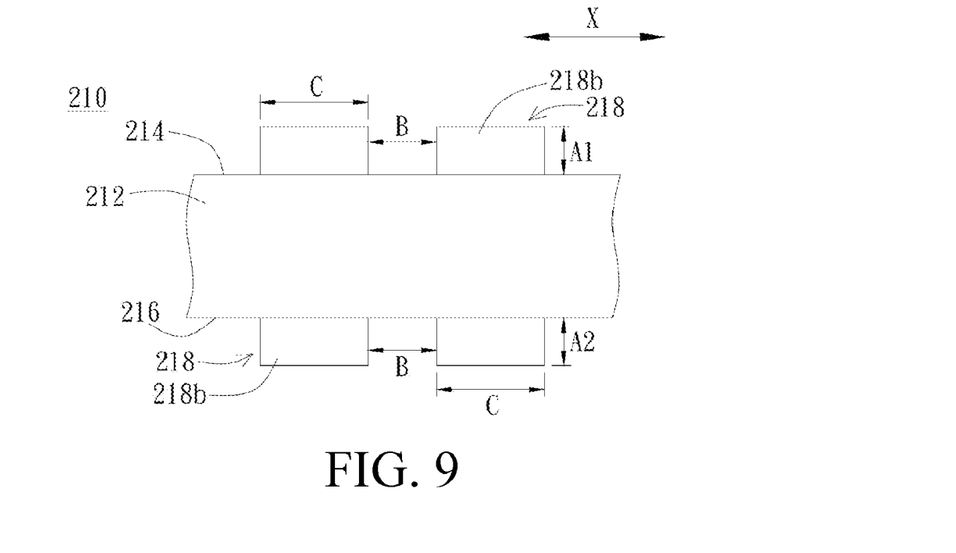
FIG. 9 is an enlarged cross-sectional view, corresponding to FIG. 8, of an optical film and a grating structure.

FIG. 9 is an enlarged cross-sectional view, corresponding to the embodiment of FIG. 8, of the optical film 210. As shown in FIG. 9, a ratio of a spacing B to a width C of the second grid lines 218b ranges from 1:1 to 1:5. In terms of the height A of the second grid lines 218b and the spacing B between two adjacent second grid lines 218b, a ratio of the spacing B to the height A of the second grid lines 218b preferably ranges from 1:2 to 1:10. It should be noted that, with respect to the design of the two-layer grating structure, the height is a sum of heights of the two layers of grating structures, that is, A=A1+A2. In this way, light rays can keep collimated after passing through the grid-shaped grating structure.

Figure 10A:
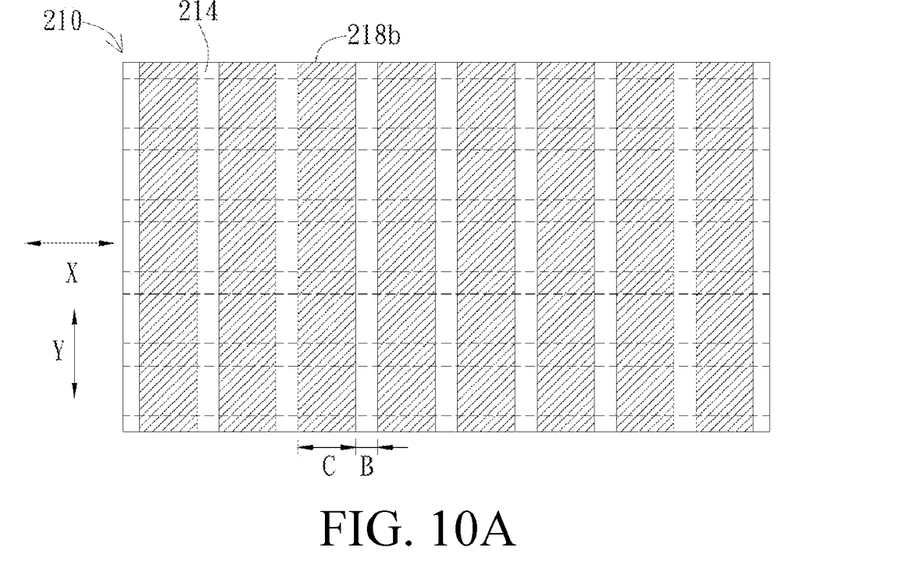
FIG. 10A and FIG. 10B are top views of a grating structure from a second surface and a first surface.
Figure 10B:
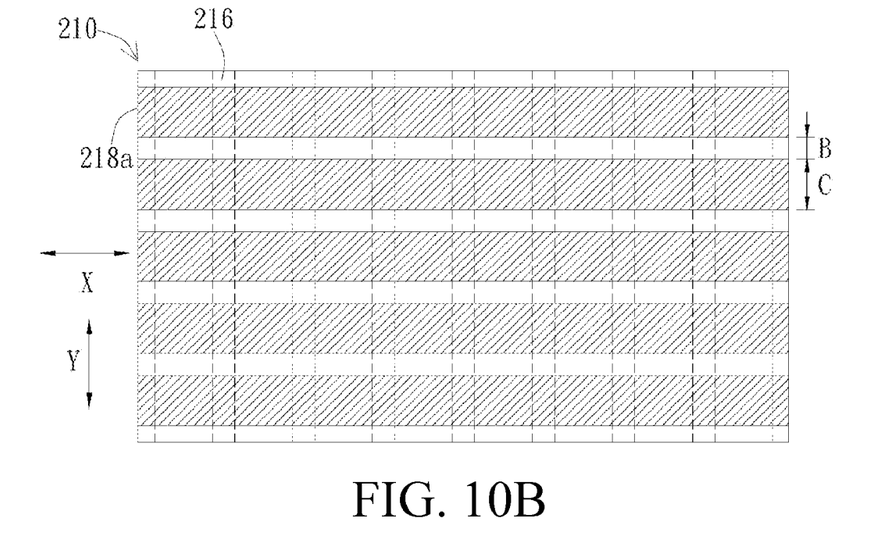

FIG. 10A and FIG. 10B are top views of the grating structure 218 from the second surface 216 and the first surface 214, respectively. As shown in FIG. 10A and FIG. 10B, different from the embodiment described above, grating structures 218 on the opposite surfaces of the transparent film 212 are each distributed along a uniform direction, where one layer of grating structure extends along the first direction (or the second direction), and the other layer of grating structure extends along the second direction (or the first direction). As shown in FIG. 10A, the second grid lines 218b are disposed on the first surface 214. The second grid lines 218b are arranged along the second direction Y, and the plurality of second grid lines 218b is parallel to each other and is arranged at intervals. The first grid lines 218a are disposed on the second surface 216. Similarly, the first grid lines 218a are arranged along the first direction X, and the plurality of first grid lines 218a is parallel to each other and is arranged at intervals. As viewed from the top view, unidirectional grating structures 218a and 218b on different surfaces together form a grid-shaped structure. In other word, the transparent film 212 is sandwiched between the first grid lines 218a and the second grid lines 218b. Compared with the grating structure 218 in which a grid shape is formed on both surfaces, the two-layer unidirectionally arranged structure used in FIG. 10A and FIG. 10B can further reduce the manufacturing time and improve a production rate.

Figure 11:
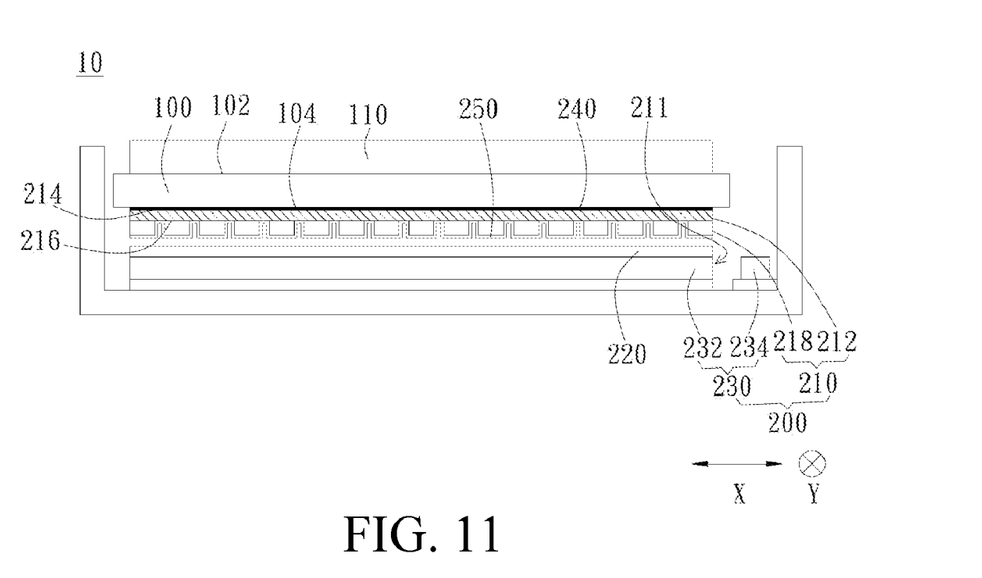
FIG. 11 is a cross-sectional view of an embodiment in which a protective layer is disposed for a grating structure.

FIG. 11 is a cross-sectional view of an embodiment in which a protective layer 250 is disposed for the grating structure 218. In the embodiment of FIG. 11, the image sensing device 10 further includes an adhesive layer 240 and the protective layer 250. As shown in FIG. 11, the adhesive layer 240 is disposed between the optical film 210 and the substrate 100. The adhesive layer 240 can prevent debris from scattering when the substrate 100 is damaged, which further improves the usage safety. The protective layer 250 covers the grating structure 218. As the protective layer 250 is disposed, the grating structure 218 can be protected from scratch and damage.

In conclusion, in the image sensing device of the present invention, an image quality is improved by using an optical film that has different transmittances in long and short-wavelength wave bands of visible light. A grating structure in the optical film can collimate emergent light, which prevents scattering light rays from degrading image quality. In addition, a spacing/width ratio and a spacing/height ratio of the grating structure can be adjusted to further improve an image quality. Moreover, with the optical film having the grating structure of the present invention, multiple optical films can be saved, so that the thickness of the entire device is reduced.

The present invention is described by using the foregoing related embodiments, but the foregoing embodiments are merely examples of the present invention. It should be noted that, the disclosed embodiments do not limit the scope of the present invention. On the contrary, modifications and equivalent settings without departing from the scope and spirit of the claims are all encompassed in the scope of the present invention.

What is claimed is:

1. An image sensing device, comprising:
   a substrate;
   a light sensing circuit, disposed on the substrate;
   an optical film, comprising:
      a transparent film, having a first light transmittance value wherein said first light transmittance value comprises a red light transmittance value and a blue light transmittance value, and said red light transmittance value is greater than said blue light transmittance value; and
      a grating structure, having a second light transmittance value, wherein said first light transmittance value is greater than said second light transmittance value;
      wherein said substrate is sandwiched between said light sensing circuit and said optional film; and
   a light source, disposed on the optical film, wherein said optical film is sandwiched between said substrate and said light source.

2. The image sensing device according to claim 1, wherein the grating structure is a grid, and the grid comprises:
   a plurality of first grid lines parallel to each other and arranged at intervals; and
   a plurality of second grid lines parallel to each other and arranged at intervals;
   wherein the plurality of first grid lines and the plurality of second grid lines respectively extend along a first direction and a second direction and intersect with each other to form the grid.

3. The image sensing device according to claim 2, wherein a ratio of a spacing between any two adjacent first grid lines to a height of the first grid lines ranges from 1:2 to 1:10.

4. The image sensing device according to claim 3, the spacing between any two adjacent first grid lines ranges from 10 μm to 50 μm.

5. The image sensing device according to claim 2, wherein a ratio of a spacing between any two adjacent first grid lines to a width of the first grid lines ranges from 1:1 to 1:5.

6. The image sensing device according to claim 5, the spacing between any two adjacent first grid lines ranges from 10 μm to 50 μm.

7. The image sensing device according to claim 2, wherein the grating structure comprises a first grating structure and a second grating structure; and
   wherein said transparent film is sandwiched between said first grating structure and said second grating structure, and said first grating structure and said second grating structure are symmetrical.

8. The image sensing device according to claim 2, wherein said transparent film is sandwiched between the first grid lines and the second grid lines.

9. The image sensing device according to claim 2, wherein the grid is made of a metal material or an insulating light shielding material.

10. The image sensing device according to claim 1, wherein the transparent film is a dyed yellow or red transparent film.

11. The image sensing device according to claim 1, wherein said first light transmittance value further comprises an ultraviolet light transmittance value, and said blue light transmittance value is greater than said ultraviolet light transmittance value.

12. The image sensing device according to claim 1, wherein the transparent film is made of polyimide (PI) or polyethylene terephthalate (PET).

13. The image sensing device according to claim 1, further comprising an adhesive layer disposed between the optical film and the substrate.

14. The image sensing device according to claim 1, further comprising a protective layer covering the grating structure.

15. The image sensing device according to claim 1, wherein the light source further comprises:
   a light guide plate; and
   a light emitting module for emitting light rays, wherein the light rays reach the optical film via the light guide plate.

* * * * *